United States Patent
Momiyama

[11] 4,129,359
[45] Dec. 12, 1978

[54] EXTENDING ATTACHMENT LENS
[75] Inventor: Kikuo Momiyama, Yokohama, Japan
[73] Assignee: Canon Kabushiki Kaisha, Tokyo, Japan
[21] Appl. No.: 801,355
[22] Filed: May 27, 1977
[30] Foreign Application Priority Data
  Jun. 1, 1976 [JP] Japan .................. 51-63905
[51] Int. Cl.² ............ G02B 9/34; G02B 9/60
[52] U.S. Cl. .................. 350/183; 350/216; 350/220
[58] Field of Search ........... 350/214, 216, 220, 183
[56] References Cited
  U.S. PATENT DOCUMENTS
  1,168,873  1/1916  Florian .................. 350/220
  3,441,338  4/1969  Johnson ................. 350/183

Primary Examiner—Conrad J. Clark
Attorney, Agent, or Firm—Toren, McGeady and Stanger

[57] ABSTRACT

An objective system including a prime lens objective followed by a negative attachment which consists of a negative doublet of a biconvex lens cemented together with a biconcave lens, a biconvex lens, a middle biconcave lens followed after an axial air space by a biconvex lens and a biconcave lens. The middle biconcave lens has a front surface smaller in radius of curvature than that of a rear surface thereof. The present invention is to provide for an increased axial separation between the front principal point of the attachment and the focal point of the prime lens objective while improving field curvature of image.

4 Claims, 9 Drawing Figures

Spherical Aberration
Sine Condition

Astigmatism

Distortion Aberration

EXTENDING ATTACHMENT LENS

BACKGROUND OF THE INVENTION

This invention relates to an objective system including a basic objective lens of the ordinary photographic type followed by an attachment lens to extend the focal length of the basic objective lens and, more particularly, to improvements of such attachment lens.

It is known to provide an objective system including a basic objective of fixed focal length either preceeded or followed by an attachment lens of fixed focal length to thereby extend or shorten the focal length of the basic objective. The attachment lens adapted for use at the front of the basic objective is with disadvantage increased in bulk and weight, while the attachment lens adapted for use at the rear, though having an advantage of facilitating further minimization of the bulk and weight compared with the former type attachment lens, presents a more difficult problem in order to achieve good correction of aberrations and, particularly, of field curvature of image.

To overcome the above mentioned drawbacks of such attachment lens, one solution has been proposed by the present applicant in Japanese Patent Publication No.Sho 51-12421. According to this proposal, the attachment lens is divided into two main groups of lens elements, the front group being of negative power and the rear group being of positive power, characterized in that the position of the front principal point is moved further ahead, and each of the lens groups is constructed from strong positive and negative lenses to make use of a low refractive index glass for the positive lens and of a high refractive index glass for the negative lens, whereby an improvement of the Petzval sum is effected.

SUMMARY OF THE INVENTION

An object of the present invention is to provide an objective system of the type in which a basic objective is followed by an attachment lens.

Another object is to achieve further improvement of the picture quality attributed to the attachment lens with a magnifying power of up to 2X.

DESCRIPTION OF THE PREFERRED EMBODIMENTS

Figure 1:
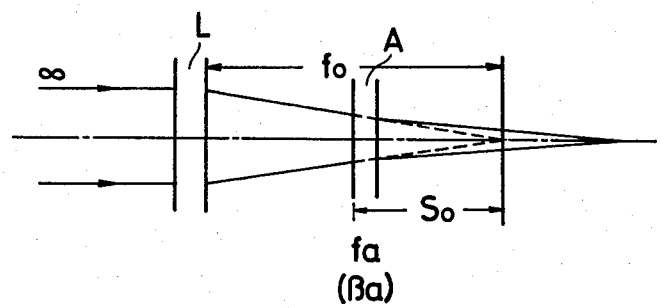
FIG. 1 is a diagram of geometry considered in defining predesign parameters of an attachment lens when positioned in the rear of a prime lens.

Referring to FIG. 1, there is schematically shown a basic objective lens L having a fixed focal length, fo, focused at infinity. An attachment lens A having a fixed focal length, fa, is positioned behind the basic objective L with an axial separation between the front principal point of the attachment A and the focal point of the basic objective L being designated by So. Hence, the magnifying power, $\beta a$, of the attachment A may be defined as $\beta a = fa/(fa + So)$, and the combined focal length F of the basic objective 1 and attachment A as:

$$F = fo \times \beta a = fo \times \frac{fa}{fa + So}$$

If the magnifying power of the attachment A is given a desired value larger than unity, the focal length, fa, of the attachment A is determined to be a value of negative sign as a function of only one variable, So, that is, the object distance for the attachment, A, which may be expressed as:

$$fa = So \times \frac{\beta a}{1 - \beta a}$$

The larger the variable, So, the smaller can refractive power be made to facilitate aberrational correction. As far as the conventional design features are concerned, however, the increase in So can not be made as large as desired because of the occurrence of mechanical interference between the rear vertex of the basic objective L and the front vertex of the attachment A. On this account, the conventional attachment lens is designed to have a relatively small focal length in the negative sense with the resulting Petzval sum of negative sign for the overall system being increased in absolute value. This constitutes the most serious problem of the conventional attachment lens design which is intended to lead to the production of a large field curvature of image.

Figure 2:
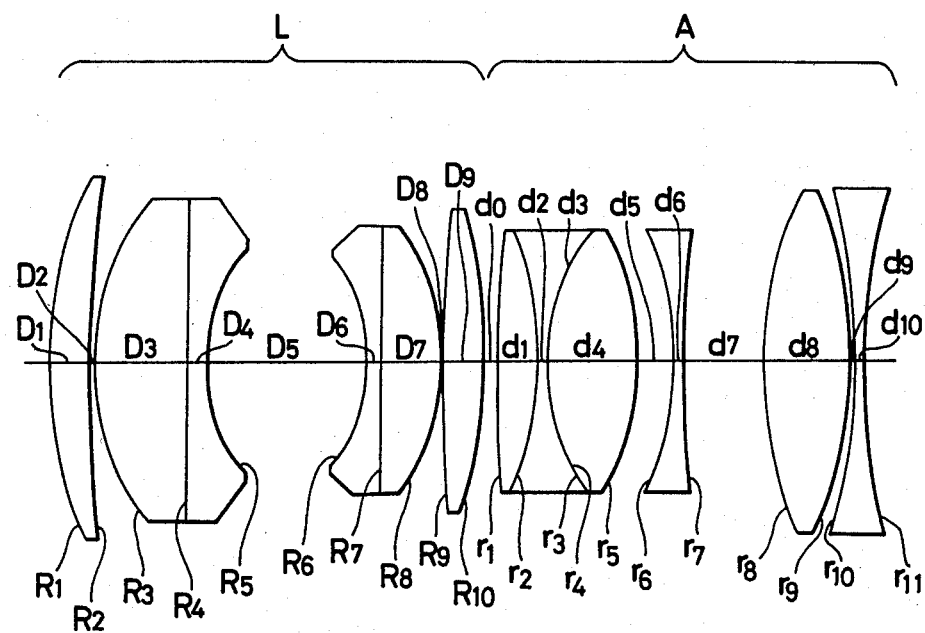
FIG. 2 is a lens block diagram of one embodiment of an attachment lens according to the present invention positioned at the rear of a Speed Panchro Type objective.
Figure 4:
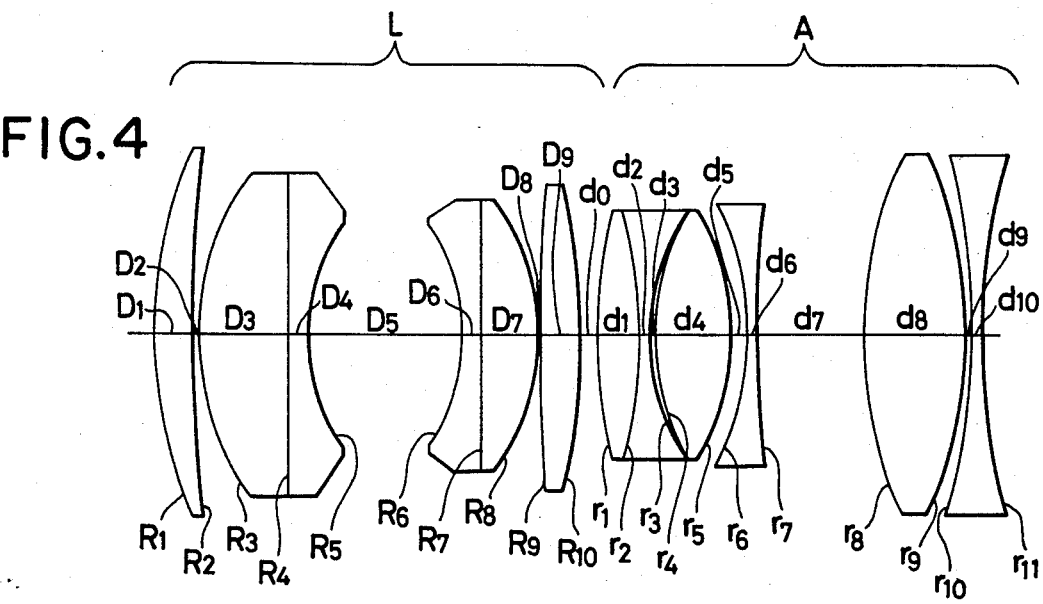
FIG. 4 is a lens block diagram of another embodiment of the present invention.

Referring now to FIG. 2, there is shown an objective lens system including a basic objective L, in this instance, of the Speed Panchro type, followed by an attachment A of the invention which may be considered as comprising front and rear groups of six lens elements, of which the front group is of negative power and consists of, from front to rear, a triplet of a biconvex lens having a rear surface of stronger convexity toward the image than that of a front surface thereof, biconcave lens, and a biconvex lens which may be of broken contact with the second or biconcave lens as shown in FIG. 4 embodiment, and a biconcave singlet having a front surface of stronger concavity toward the object than that of a rear surface thereof. The rear group of positive power consists of a biconvex lens and a biconcave lens, and which is characterized by the following relationships:

$$1 < \frac{|f_A|}{|f_{1,2,3,4}|} < 1.5 \quad (f_A < 0, f_{1,2,3,4} < 0) \tag{1}$$

$$-0.2 < \frac{e}{|f_A|} < 0.1 \tag{2}$$

$$4.5 < |f_A| \times \left(\frac{1}{f_1} + \frac{1}{f_3} + \frac{1}{f_5}\right) < 7 \tag{3}$$

$$0.18 < \overline{NC} - \overline{NV} \tag{4}$$

$$0.45 < \frac{r_2}{|f_A|} < 0.9 \quad (r_2 < 0) \tag{5}$$

$$0.3 < \frac{r_3 + r_4}{2|f_A|} < 0.5 \tag{6}$$

$$0.7 < \frac{r_5}{r_6} < 1 \quad (r_5 < 0, r_6 < 0) \tag{7}$$

-continued $$0.45 < \frac{r_9}{r_{10}} < 0.8 \quad (r_9 < 0, r_{10} < 0) \tag{8}$$

$$0.01 < \frac{d_5}{|f_A|} < 0.075 \tag{9}$$

$$-0.04 < |f_A| \times (\frac{1}{f_1 V_1} + \frac{1}{f_2 V_2} + \frac{1}{f_3 V_3} + \frac{1}{f_4 V_4}) < 0.01 \tag{10}$$

$$-0.02 < |f_A| \times (\frac{1}{f_5 V_5} + \frac{1}{f_6 V_6}) < 0.01 \tag{11}$$

wherein $f_A$ is the focal length of the overall attachment lens system; $f_{1,2,3,4}$ is the focal length of the front group; e is the axial separation between the principal points of the front and rear groups; $f_1$, $f_2$, $f_3$, $f_4$ and $f_5$ are the focal lengths of the first, second, third, fourth and fifth lens elements respectively; $r_2$, $r_3$, $r_4$, $r_5$, $r_6$, $r_9$ and $r_{10}$ are the radii of curvature of the second, third, fourth, fifth, sixth, ninth and tenth lens surfaces respectively; $d_5$ is the axial separation between the third and fourth lens elements; $\overline{NV}$ is the average value of the refractive indices of all the convex lenses in the attachment; $\overline{NC}$ is the average value of the refractive indices of all the concave lenses in the attachment; and $V_1$, $V_2$, $V_3$, $V_4$, $V_5$ and $V_6$ are the Abbe numbers of the first, second, third, fourth, fifth and sixth lens elements respectively.

The attachment of the present invention is designed to increase the distance, So, between the front principal point thereof and the focal point of the basic objective without causing mechanical interference between the attachment and the basic objective. In other words, this is accomplished with assurance of a sufficient air space between the objective and attachment, while permitting the Petzval sum to be improved with prevention of deterioration of field curvature of image. Such purposes have been accomplished by the distribution of the refractive power specified in condition 1 in combination with the axial separation of the principal points of the front and rear lens groups specified in condition 2, as the attachment is divided into the two main groups. When the lower limit of condition 1 is violated, it is difficult to perform satisfactory compensation of the Petzval sum. When the upper limit is exceeded, aberrations and particularly spherical aberration are deteriorated. When the lower limit of condition 2 is violated, it is difficult to perform satisfactory compensation of the Petzval sum, while, when the upper limit is exceeded, coma becomes unacceptable.

Within the framework of conditions 1 and 2, an improvement of the Petzval sum can be effected by increasing the refractive power of each lens element and by making use of a lower refractive index glass for the convex lens element in the attachment and of a high refractive index glass for the concave lens element in the attachment. When the lower limits of conditions 3 and 4 are violated, it becomes impossible to effect good compensation of the Petzval sum. When the upper limit of condition 3 is violated, correction of spherical aberration, coma, and astisgmatism becomes difficult.

Conditions 5 and 6 have the purpose of increasing the refractive power of each of the first, second and third lens elements under condition 3 to effect an improvement of the Petzval sum. When the upper limits of these conditions are violated, the improvement of the Petzval sum becomes impossible, while when the lower limits are violated, the spherical aberration becomes objectionable.

Condition 7 is effective in correcting spherical aberration which would be otherwise deteriorated under conditions 5 and 6. When the upper limit is violated, correction of coma becomes difficult.

Condition 8 is effective in correcting astigmatism. When the upper limit is violated, good correction of astigmatism becomes impossible, while when the lower limit is violated, coma becomes objectionable.

Condition 9 has the purpose of balancing spherical aberration, coma and astigmatism. When the upper limit is violated, under-correction of spherical aberration and coma is resulted, and over-correction of astigmatism is resulted. When the lower limit is violated, the case is reversed. In either case, good balance of the aberrations cannot be obtained.

Conditions 10 and 11 have the purpose of making achromatic the front and rear lens groups respectively to achieve simultaneous correction of longitudinal and transverse chromatic aberrations.

Two examples of specific objective lens systems which have a common basic objective may be constructed in accordance with the numerical values shown below. At first, an example of a specific Speed Panchro type basic objective is shown in Table 1 in which the radii of curvature, R, the axial thicknesses and air separations, D, the indices of refraction of the various lens elements, N, and the Abbe numbers of the various lens elements are all expressed with the usual subscripts numbered consecutively from front to rear. The minus values of the radii, R, indicate surfaces concave toward incident light.

Table 1

| f = 1 | | F 1:1.8 | 2ω = 45° |
|---|---|---|---|
| $R_1 = 0.75095$ | | | |
| | $D_1 = 0.0620$ | $N_1 = 1.80610$ | $V_1 = 40.7$ |
| $R_2 = 2.8513$ | | | |
| | $D_2 = 0.0058$ | | |
| $R_3 = 0.41975$ | | | |
| | $D_3 = 0.1532$ | $N_2 = 1.60342$ | $V_2 = 38.0$ |
| $R_4 = \infty$ | | | |
| | $D_4 = 0.0291$ | $N_3 = 1.7552$ | $V_3 = 27.5$ |
| $R_5 = 0.29326$ | | | |
| | $D_5 = 0.2576$ | | |
| $R_6 = 0.28668$ | | | |
| | $D_6 = 0.0213$ | $N_4 = 1.72825$ | $V_4 = 28.3$ |
| $R_7 = 8.7237$ | | | |
| | $D_7 = 0.0969$ | $N_5 = 1.80610$ | $V_5 = 40.7$ |
| $R_8 = -0.37713$ | | | |
| | $D_8 = 0.0019$ | | |
| $R_9 = 5.4811$ | | | |
| | $D_9 = 0.0581$ | $N_6 = 1.80610$ | $V_6 = 40.7$ |
| $R_{10} = -0.89548$ | | | |

Back focus = 0.69626

The spherical aberration coefficients, I, coma coefficients, II, astigmatism coefficients, III, Petzval sum, P, and distortion coefficients of the above specified basic objective are given in Table 2 below.

Table 2

| No | I | II | III | P | V |
|---|---|---|---|---|---|
| $R_1$ | 0.5832 | 0.1697 | 0.0494 | 0.5942 | 0.1873 |
| $R_2$ | 0.0976 | −0.2601 | 0.6932 | −0.1565 | −0.4307 |
| $R_3$ | 0.0977 | 0.0279 | 0.0080 | 0.8964 | 0.2585 |
| $R_4$ | −0.4994 | 0.4480 | −0.4018 | 0. | 0.3604 |
| $R_5$ | −1.1515 | −0.4767 | −0.1974 | −1.4669 | −0.6891 |
| $R_6$ | −3.0325 | 0.9418 | −0.2925 | −1.4696 | 0.5473 |
| $R_7$ | 0.0453 | 0.0671 | 0.0994 | 0.0029 | 0.1515 |
| $R_8$ | 2.1303 | −0.3976 | −0.0742 | 1.1833 | −0.2347 |
| $R_9$ | −0.0021 | 0.0206 | −0.1983 | 0.0814 | 1.1245 |
| $R_{10}$ | 1.9485 | −0.5240 | 0.1409 | 0.4983 | −0.1719 |
| Σ | 0.2171 | 0.0167 | −0.0249 | 0.1635 | 0.1031 |

In the following tables for the specific attachment lenses, the radii of curvature, r, the axial thicknesses of the various lens elements and the axial separations between the successive lens elements, d, with $d_0$ being the axial air separation between the basic objective and the attachment lens, the indices of refraction of the various lens elements, n, and the Abbe numbers of the various lens elements, V, are expressed with the usual subscripts numbered consecutively from front to rear.

EXAMPLE 1

Table 3

| Fcomp. = 2.0 | F = 1:5.6 | | 2w = 24.4° |
|---|---|---|---|
| | $d_0 = 0.018$ | | |
| $r_1 = 2.32450$ | | | |
| | $d_1 = 0.0678$ | $n_1 = 1.62004$ | $V_1 = 36.3$ |
| $r_2 = -0.56230$ | | | |
| | $d_2 = 0.0194$ | $n_2 = 1.8300$ | $V_2 = 41.0$ |
| $r_3 = 0.36152$ | | | |
| | $d_3 = 0$ | | |
| $r_4 = 0.36152$ | | | |
| | $d_4 = 0.1453$ | $n_3 = 1.62004$ | $V_3 = 36.3$ |
| $r_5 = -0.44218$ | | | |
| | $d_5 = 0.0586$ | | |
| $r_6 = -0.50757$ | | | |
| | $d_6 = 0.0194$ | $n_4 = 1.77250$ | $V_4 = 49.7$ |
| $r_7 = 3.16250$ | | | |
| | $d_7 = 0.1234$ | | |
| $r_8 = 0.62789$ | | | |
| | $d_8 = 0.1453$ | $n_5 = 1.51835$ | $V_5 = 60.3$ |
| $r_9 = -0.73310$ | | | |
| | $d_9 = 0.0039$ | | |
| $r_{10} = -1.16430$ | | | |
| | $d_{10} = 0.0252$ | $n_6 = 1.77250$ | $V_6 = 49.7$ |
| $r_{11} = 1.13610$ | | | |

Note)
Fcomp.: the compound focal length of the attachment and basic objective.

Figure 3:
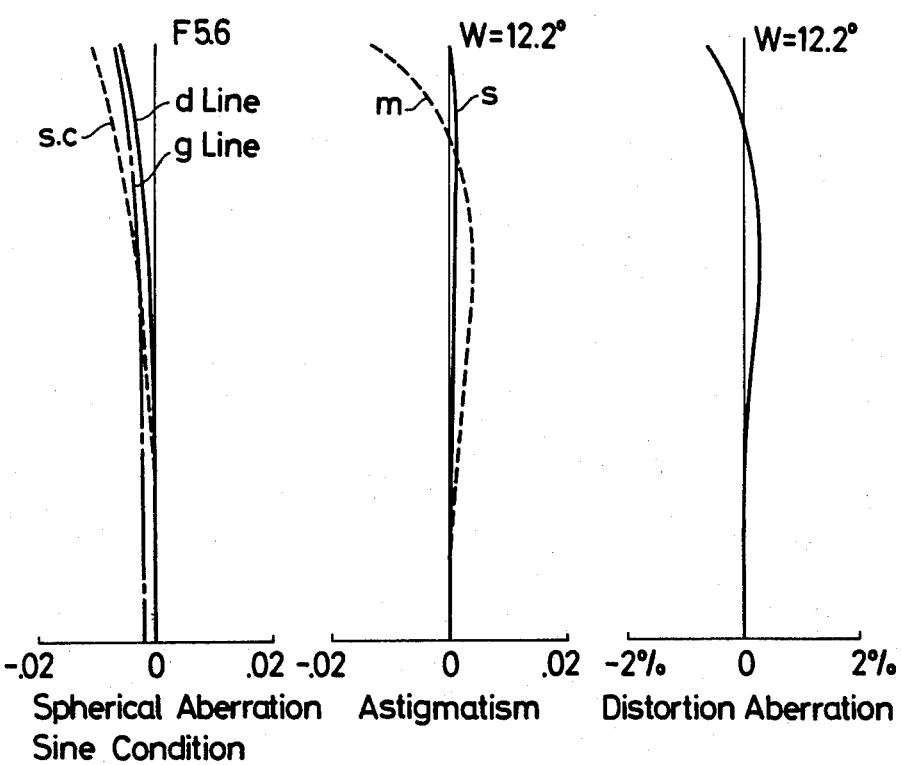
FIGS. 3A, 3B and 3C are graphic representations of the spherical aberration, astigmatism and distortion of the objective system of FIG. 1 respectively.

Example 1 corresponds to the lens configuration of FIG. 2, and its aberrations are shown in FIG. 3.

The various aberration coefficients of the above specified attachment lens combined with the above specified basic objective when focused at infinity are given in Table 4 below.

Table 4

| No. | I | II | III | P | V |
|---|---|---|---|---|---|
| $R_1$ | 4.6849 | 0.6815 | 0.0991 | 1.1900 | 0.1875 |
| $R_2$ | 0.7837 | -1.0429 | 1.3879 | -0.3134 | -1.4300 |
| $R_3$ | 0.7850 | 0.1121 | 0.0160 | 1.7952 | 0.2587 |
| $R_4$ | -4.0114 | 1.7960 | -0.8041 | 0.0000 | 0.3600 |
| $R_5$ | -9.2491 | -1.9136 | -0.3959 | -2.9378 | -0.6897 |
| $R_6$ | -24.3587 | 3.7732 | -0.5844 | -2.9432 | 0.5464 |
| $R_7$ | 0.3637 | 0.2691 | 0.1992 | 0.0057 | 0.1516 |
| $R_8$ | 17.1114 | -1.5917 | 0.1480 | 2.3697 | -0.2342 |
| $R_9$ | -0.0172 | 0.0826 | -0.3971 | 0.1630 | 1.1243 |
| $R_{10}$ | 15.6515 | -2.0989 | 0.2814 | 0.9980 | -0.1715 |
| $r_1$ | -1.5032 | 1.1289 | -0.8478 | 0.3296 | 0.3891 |
| $r_2$ | -9.0417 | -0.6510 | -0.0468 | -0.3069 | -0.0254 |
| $r_3 + r_4$ | -2.2906 | -1.5911 | -1.1052 | -0.4774 | -1.0994 |
| $r_5$ | 33.2213 | 4.6335 | 0.6462 | 1.7331 | 0.3318 |
| $r_6$ | -22.6512 | -3.0999 | -0.4242 | -1.7193 | -0.2933 |
| $r_7$ | 0.0317 | -0.1414 | 0.6308 | -0.2759 | -1.5828 |
| $r_8$ | -0.0191 | -0.0724 | -0.2735 | 1.0887 | 3.0790 |
| $r_9$ | 5.0769 | 1.5022 | 0.4445 | 0.9824 | 0.4074 |
| $r_{10}$ | -4.2397 | -0.7391 | -0.1288 | -0.7495 | -0.1531 |
| $r_{11}$ | 0.0227 | -0.1506 | 0.9998 | -0.7681 | -1.5376 |
| $\Sigma$ | 0.3506 | 0.8863 | -0.1550 | 0.1140 | -0.3812 |

EXAMPLE 2

Table 5

| | $d_0 = 0.018$ | | |
|---|---|---|---|
| $r_1 = 0.88916$ | | | |
| | $d_1 = 0.0678$ | $n_1 = 1.59551$ | $V_1 = 39.2$ |
| $r_2 = -0.70293$ | | | |
| | $d_2 = 0.0194$ | $n_2 = 1.88300$ | $V_2 = 41.0$ |
| $r_3 = 0.36473$ | | | |
| | $d_3 = 0.0136$ | | |
| $r_4 = 0.41664$ | | | |
| | $d_4 = 0.1163$ | $n_3 = 1.61293$ | $V_3 = 37.0$ |
| $r_5 = -0.39847$ | | | |
| | $d_5 = 0.0194$ | | |
| $r_6 = -0.47409$ | | | |
| | $d_6 = 0.0194$ | $n_4 = 1.77250$ | $V_4 = 49.7$ |
| $r_7 = 1.50314$ | | | |

Table 5-continued

| | $d_7 = 0.1801$ | | |
|---|---|---|---|
| $r_8 = 1.68120$ | | | |
| | $d_8 = 0.1686$ | $n_5 = 1.50657$ | $V_5 = 62.0$ |
| $r_9 = -0.68208$ | | | |
| | $d_9 = 0.0029$ | | |
| $r_{10} = -1.28661$ | | | |
| | $d_{10} = 0.0252$ | $n_6 = 1.77250$ | $V_6 = 49.7$ |
| $r_{11} = 1.09957$ | | | |

Figure 5A:
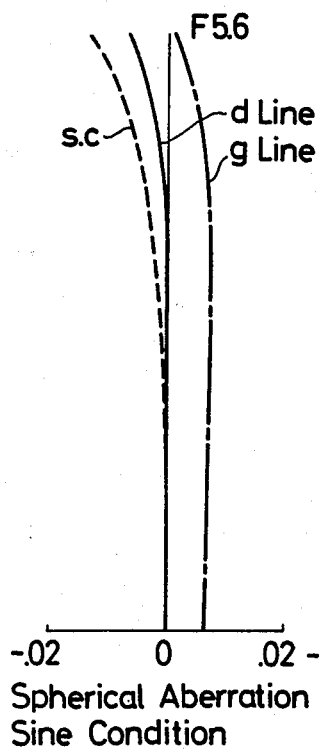
FIGS. 5A, 5B and 5C are graphic representations of the aberrations of the objective system of FIG. 4.
Figure 5B:
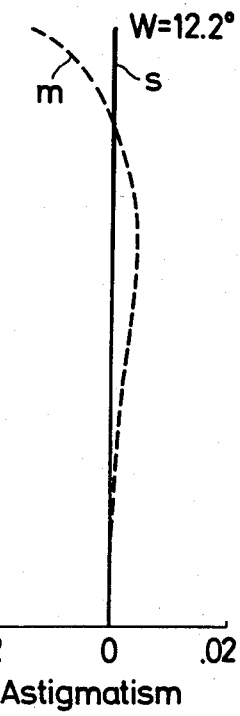
Figure 5C:
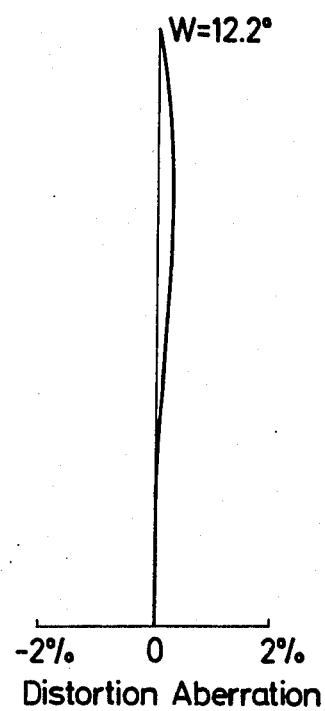

Note) Example 2 corresponds to the lens configuration of FIG. 4, and its aberrations are shown in FIG. 5.

The various aberration coefficients of Example 2 attachment lens combined with the above specified basic objective when focused at infinity are given in Table 6 below.

Table 6

| No | I | II | III | P | V |
|---|---|---|---|---|---|
| $R_1$ | 4.6868 | 0.6817 | 0.0991 | 1.1902 | 0.1875 |
| $R_2$ | 0.7840 | -1.0432 | 1.3881 | -0.3134 | -1.4300 |
| $R_3$ | 0.7853 | 0.1121 | 0.0160 | 1.7954 | 0.2587 |
| $R_4$ | -4.0131 | 1.7965 | -0.8042 | 0.0000 | 0.3600 |
| $R_5$ | -9.2529 | -1.9142 | -0.3960 | -2.9382 | -0.6897 |
| $R_6$ | -24.3686 | 3.7742 | -0.5845 | -2.9436 | 0.5464 |
| $R_7$ | 0.3639 | 0.2692 | 0.1992 | 0.0057 | 0.1516 |
| $R_8$ | 17.1184 | -1.5921 | 0.1480 | 2.3700 | -0.2342 |
| $R_9$ | -0.0172 | 0.0826 | -0.3971 | 0.1630 | 1.1243 |
| $R_{10}$ | 15.6579 | -2.0995 | 0.2815 | 0.9981 | -0.1715 |
| $r_1$ | -0.1314 | 0.3700 | -1.0415 | 0.8406 | 0.5655 |
| $r_2$ | -9.3688 | -0.5174 | -0.0285 | -0.2726 | -0.0166 |
| $r_3$ | -10.6887 | -8.3796 | -6.5693 | -2.5747 | -7.1687 |
| $r_4$ | 7.2683 | 6.1730 | 5.2427 | 1.8265 | 6.0039 |
| $r_5$ | 47.9143 | 8.2061 | 1.4054 | 1.9098 | 0.5677 |
| $r_6$ | -38.2020 | -5.7984 | -0.8801 | -1.8410 | -0.4130 |
| $r_7$ | 0.0000 | -0.0059 | 0.5987 | -0.5806 | -1.8157 |
| $r_8$ | -0.0186 | -0.0804 | -0.3461 | 0.9885 | 2.7650 |
| $r_9$ | 4.9876 | 1.8587 | 0.6927 | 0.9872 | 0.6260 |
| $r_{10}$ | -3.7368 | -0.7479 | -0.1497 | -0.6783 | -0.1657 |
| $r_{11}$ | 0.0204 | -0.1431 | 1.0004 | -0.7937 | -1.4449 |
| $\Sigma$ | -0.2112 | 1.0024 | -0.1251 | 0.1390 | -0.3932 |

The various parameters in the specific requirements take the following values for Examples 1 and 2 in Table 7 below.

Table 7

| | Example 1 | Example 2 |
|---|---|---|
| $f_A$ | -0.9660 | -1.0145 |
| e | -0.1310 | -0.1074 |
| $f_1$ | 0.7369 | 0.6699 |
| $f_2$ | -0.2468 | -0.2697 |
| $f_3$ | 0.3446 | 0.35135 |
| $f_4$ | -0.5649 | -0.4646 |
| $f_5$ | 0.67716 | 0.70199 |
| $f_6$ | -0.7408 | -0.7640 |
| $\|f_A\|/\|f_{1,2,3,4}\|$ | 1.2063 | 1.2158 |
| $e/\|f_A\|$ | -0.1356 | -0.1059 |
| $\|f_A\|(1/f_1 + 1/f_3 + 1/f_5)$ | 5.5407 | 5.8470 |
| $\overline{NC} - \overline{NV}$ | 0.2232 | 0.2377 |
| $\|r_2\|/\|f_A\|$ | 0.5821 | 0.6929 |
| $(r_3 + r_4)/2\|f_A\|$ | 0.3742 | 0.3851 |
| $r_5/r_6$ | 0.8712 | 0.8405 |
| $r_9/r_{10}$ | 0.6296 | 0.5301 |
| $d_5/\|f_A\|$ | 0.0607 | 0.0191 |
| $\|f_A\|(1/f_1V_1 + 1/f_2V_2 + 1/f_3V_3 + 1/f_4V_4)$ | -0.0165 | -0.0190 |
| $\|f_A\|(1/f_5V_5 + 1/f_6V_6)$ | -0.0026 | -0.0034 |

What is claimed is:

1. An extending attachment lens comprising:
   a first lens having a positive power, with the radius of curvature of a rear surface thereof being smaller than that of a front surface thereof;
   a second lens which is a biconcave lens cemented together with the first lens;
   a third lens which is a biconvex lens positioned adjacent the second lens;

a fourth lens having a negative power with its front surface concave toward the front and with the radius of curvature of the front surface being smaller than that of a rear surface thereof;
a fifth lens which is a biconvex lens; and
a sixth lens which is a biconcave lens,
the combined power of the first lens, the second lens, the third lens, the fourth lens and the fifth lens being negative, and characterized by the following relationships:

$$1 < \frac{|f_A|}{|f_{1,2,3,4}|} < 1.5 \quad (f_A < 0, f_{1,2,3,4} < 0) \tag{1}$$

$$-0.2 < \frac{e}{|f_A|} < 0.1 \tag{2}$$

$$4.5 < |f_A| \times \left(\frac{1}{f_1} + \frac{1}{f_3} + \frac{1}{f_5}\right) < 7 \tag{3}$$

$$0.18 < \overline{NC} - \overline{NV} \tag{4}$$

$$0.45 < \frac{r_2}{|f_A|} < 0.9 \quad (r_2 < 0) \tag{5}$$

$$0.3 < \frac{r_3 + r_4}{2|f_A|} < 0.5 \tag{6}$$

$$0.7 < \frac{r_5}{r_6} < 1 \quad (r_5 < 0, r_6 < 0) \tag{7}$$

$$0.45 < \frac{r_9}{r_{10}} < 0.8 \quad (r_9 < 0, r_{10} < 0) \tag{8}$$

$$0.01 < \frac{d_5}{|f_A|} < 0.075 \tag{9}$$

$$-0.04 < |f_A| \times \left(\frac{1}{f_1 V_1} + \frac{1}{f_2 V_2} + \frac{1}{f_3 V_3} + \frac{1}{f_4 V_4}\right) < 0.01 \tag{10}$$

$$-0.02 < |f_A| \times \left(\frac{1}{f_5 V_5} + \frac{1}{f_6 V_6}\right) < 0.01 \tag{11}$$

wherein $f_A$ is the focal length of the overall attachment lens system; $f_{1,2,3,4}$ is the combined focal length of the first, the second, the third and the fourth lenses; e is the axial separation between the combined principal point of the first, the second, the third, and the fourth lenses and the combined principal point of the fifth and the sixth lenses; $f_1$, $f_2$, $f_3$, $f_4$ and $f_5$ are the focal lengths of the first lens, the second lens, the third lens, the fourth lens and the fifth lens respectively; $r_2$, $r_3$, $r_4$, $r_5$, $r_6$, $r_9$ and $r_{10}$ are the radii of curvature of the second surface, the third surface, the fourth surface, the fifth surface, sixth surface, the ninth surface and the tenth surface respectively; $d_5$ is the axial separation between the third and fourth lenses; $\overline{NV}$ is the average value of the refractive indices of all the positive lenses in the attachment; $\overline{NC}$ is the average value of the refractive indices of all the negative lenses in the attachment; and $V_1$, $V_2$, $V_3$, $V_4$, $V_5$ and $V_6$ are the Abbe numbers of the first, second, third, fourth, fifth and sixth lenses respectively.

2. An extending attachment lens according to claim 1, wherein said second lens and said third lens are cemented together.

3. An optical system with an extending attachment lens comprising:
a primary lens having a positive power and consisting of a positive meniscus lens of forward convexity, a positive lens of strong convexity toward the front, a negative lens of strong concavity toward the rear, a forwardly concave cemented negative meniscus lens of negative and positive lens elements, and at least one positive lens;
an extending attachment lens attachable at the rear of said primary lens, having a negative power and consisting of a negative meniscus lens of a biconvex lens and a biconcave lens cemented together with each other, a biconvex lens, a biconcave lens with the radius of curvature of a front surface thereof being smaller than that of a rear surface thereof, a biconvex lens, and a biconcave lens, the absolute value of the radius of curvature of the cemented surface, $|r_2|$, of the negative meniscus lens in said extending attachment lens being larger than 0.45 times and smaller than 0.9 times the absolute value of the focal length $|f_A|$, of said extending attachment lens.

4. An optical system with an extending attachment lens according to claim 3, wherein the negative meniscus lens in said extending attachment lens is cemented together with its following biconvex lens.

* * * * *